United States Patent [19]

Torimoto

[11] Patent Number: 5,558,598
[45] Date of Patent: Sep. 24, 1996

[54] CONTROL SYSTEM FOR AUTOMATIC TRANSMISSION

[75] Inventor: Yoshifumi Torimoto, Fuji, Japan

[73] Assignee: Jatco Corporation, Fuji, Japan

[21] Appl. No.: 490,633

[22] Filed: Jun. 15, 1995

[30] Foreign Application Priority Data

Aug. 2, 1994 [JP] Japan .................................. 6-181537

[51] Int. Cl.$^6$ ................................................. B60K 41/04
[52] U.S. Cl. ......................... 477/110; 477/108; 477/155; 364/426.01
[58] Field of Search ................................ 477/77, 78, 154, 477/156, 163, 164, 108, 110, 155; 364/426.01, 424.1

[56] References Cited

U.S. PATENT DOCUMENTS

| | | | |
|---|---|---|---|
| 4,982,805 | 1/1991 | Naitou et al. | 477/108 X |
| 5,233,889 | 8/1993 | Iizuka | 477/154 |
| 5,381,337 | 1/1995 | Burgess | 364/426.01 X |
| 5,382,201 | 1/1995 | Iizuka | 477/155 X |
| 5,390,120 | 2/1995 | Caron et al. | 364/426.01 X |
| 5,396,421 | 3/1995 | Niikura et al. | 364/424.1 |
| 5,401,223 | 3/1995 | White et al. | 477/108 |
| 5,403,247 | 4/1995 | Yagi | 477/110 X |
| 5,407,023 | 4/1995 | Yamashita et al. | 364/426.01 X |
| 5,415,600 | 5/1995 | Mochizuki et al. | 477/110 |
| 5,418,726 | 5/1995 | Yagi | 364/424.1 X |
| 5,484,351 | 1/1996 | Zhang et al. | 477/110 X |

FOREIGN PATENT DOCUMENTS

| | | |
|---|---|---|
| 60-1444 | 1/1985 | Japan . |
| 63-92863 | 4/1988 | Japan . |
| 3-79853 | 4/1991 | Japan . |

*Primary Examiner*—Charles A. Marmor
*Assistant Examiner*—Peter Kwon
*Attorney, Agent, or Firm*—Foley & Lardner

[57] ABSTRACT

A control system for an automatic transmission is constructed so that when failing to detect an operation of skid reduction control, an optimum hydraulic pressure value is determined based on a basic line pressure determined by throttle opening degrees, etc. and a correction value thereof, and an optimum hydraulic pressure signal is provided to a hydraulic pressure adjusting actuator. At this time, the correction value is modified so that a shift time upon current shift approaches a reference shift time. On the other hand, when detecting an operation of skid reduction control, at least modification of the correction value is prohibited.

6 Claims, 3 Drawing Sheets

CONTROL SYSTEM FOR AUTOMATIC TRANSMISSION

BACKGROUND OF THE INVENTION

The present invention relates generally to a system for controlling an automatic transmission based on self-learning and more particularly, to the system to be arranged in a motor vehicle having a skid reducer for restraining/preventing an acceleration skid.

A conventional system for controlling an automatic transmission based on self-learning is disclosed, for example, in JP-A 63-92863. This system is constructed to detect a shift time from output of a shift command signal by shift command means to completion of shift, and provide to hydraulic pressure command means a correction signal for correcting a hydraulic pressure so that the shift time approaches a reference shift time as previously established.

Recently, some motor vehicles have a skid control device for restraining/preventing an acceleration skid of driving wheels as disclosed in JP-A 3-79853. The skid control device comprises two throttle valves for adjusting an intake air amount of an engine, i.e. a first throttle valve cooperating with an accelerator pedal and a second throttle valve as motor-driven, a sensor for detecting a revolution of non-driving wheels, and a sensor for detecting a revolution of driving wheels. The skid control device is constructed so that when detecting a skid of the driving wheels, the second throttle valve is closed to decrease output torque of the engine, restraining/preventing a skid of the driving wheels.

As for the conventional control system for an automatic transmission, however, due to absence of considering a simultaneous use of the skid control device in the motor vehicle, the following problem arises when arranging the above control system in the motor vehicle having the skid control device:

As described above, when detecting a skid of the driving wheels, the skid control device closes the second throttle valve to decrease output torque of the engine. At this time, a basic hydraulic pressure value should be varied in accordance with this change in output torque. However, since the basic hydraulic pressure value is determined by an opening degree of the first throttle valve, i.e. based on output torque during normal operation with no skid control, self-learning is erroneously carried out, i.e. an increase and decrease in a correction value is not carried out appropriately. Thus, upon subsequent shift, the optimum hydraulic pressure value determined by hydraulic pressure determination means does not correspond to an appropriate value. If the hydraulic pressure value does not correspond to the appropriate value, it is possible to aggravate shift shock or have a bad influence on the durability of friction engagement elements.

Moreover, even if the hydraulic pressure determination means determine a basic hydraulic pressure value based on a smaller one of opening degrees of the first and second throttle valves, an intake system of the engine is affected by the other throttle valve, failing to detect accurate output torque of the engine. Thus, the optimum hydraulic pressure value is established to a value near the appropriate value but with some deviation, and cannot be established to the appropriate value corresponding to output torque of the engine. Therefore, when carrying out self-learning for determining a correction value according to such inappropriate shift, self-learning is erroneously carried out, producing the above inconvenience.

It is, therefore, an object of the present invention to provide a control system for an automatic transmission which ensures accurate self-learning in a motor vehicle having a skid control device.

SUMMARY OF THE INVENTION

According to one aspect of the present invention, there is provided a system for controlling an automatic transmission of a motor vehicle provided with an engine and driving wheels, the automatic transmission having friction engagement elements, a first actuator for switching a state of supplying hydraulic pressure to the friction engagement elements, and a second actuator for adjusting hydraulic pressure, the system comprising:

means for detecting a cruising state of the motor vehicle, said detecting means including means for detecting an operation of skid reduction control for decreasing torque of the driving wheels when detecting skid thereof;

means for determining an optimum speed ratio in accordance with said cruising state detected, and providing to the first actuator a signal indicative of said optimum speed ratio determined;

means for determining an optimum value of hydraulic pressure upon shift based on a basic value of hydraulic pressure determined by at least an information on a load of the engine of said cruising state detected and a correction value thereof, and providing to the second actuator a signal indicative of said optimum value determined; and means for determining said correction value upon current shift by carrying out a comparison of a shift time upon previous shift with a reference shift time previously established, and modifying in accordance with a result of said comparison said correction value upon previous shift so that said shift time upon current shift approaches said reference shift time, said correction value determining means being prohibited from at least modifying said correction value when said operation detecting means detects said operation of skid reduction control.

Another aspect of the present invention lies in providing a method of controlling an automatic transmission of a motor vehicle provided with an engine and driving wheels, the automatic transmission having friction engagement elements, a first actuator for switching a state of supplying hydraulic pressure to the friction engagement elements, and a second actuator for adjusting hydraulic pressure, the method comprising the steps of:

detecting a cruising state of the motor vehicle, said detecting step including a step of detecting an operation of skid reduction control for decreasing torque of the driving wheels when detecting skid thereof;

determining an optimum speed ratio in accordance with said cruising state detected, and providing to the first actuator a signal indicative of said optimum speed ratio determined;

determining an optimum value of hydraulic pressure upon shift based on a basic value of hydraulic pressure determined by at least an information on a load of the engine of said cruising state detected and a correction value thereof, and providing to the second actuator a signal indicative of said optimum value determined; and determining said correction value upon current shift by carrying out a comparison of a shift time upon previous shift with a reference shift time previously established, and modifying in accordance with a result of said comparison said correction value upon previous shift so that said shift time upon current shift approaches said reference shift time, said correction value determining step being prohibited from at least modifying said correction value when said operation detecting step reveals detection of said operation of skid reduction control.

Still another aspect of the present invention lies in providing, in a motor vehicle provided with an engine, driving wheels, and an automatic transmission having friction engagement elements, a first actuator for switching a state of supplying hydraulic pressure to the friction engagement elements, and a second actuator for adjusting hydraulic pressure:

means for detecting a cruising state of the motor vehicle, said detecting means including means for detecting an operation of skid reduction control for decreasing torque of the driving wheels when detecting skid thereof;

means for determining an optimum speed ratio in accordance with said cruising state detected, and providing to the first actuator a signal indicative of said optimum speed ratio determined;

means for determining an optimum value of hydraulic pressure upon shift based on a basic value of hydraulic pressure determined by at least an information on a load of the engine of said cruising state detected and a correction value thereof, and providing to the second actuator a signal indicative of said optimum value determined; and means for determining said correction value upon current shift by carrying out a comparison of a shift time upon previous shift with a reference shift time previously established, and modifying in accordance with a result of said comparison said correction value upon previous shift so that said shift time upon current shift approaches said reference shift time, said correction value determining means being prohibited from at least modifying said correction value when said operation detecting means detects said operation of skid reduction control.

DETAILED DESCRIPTION OF THE INVENTION

Figure 1:
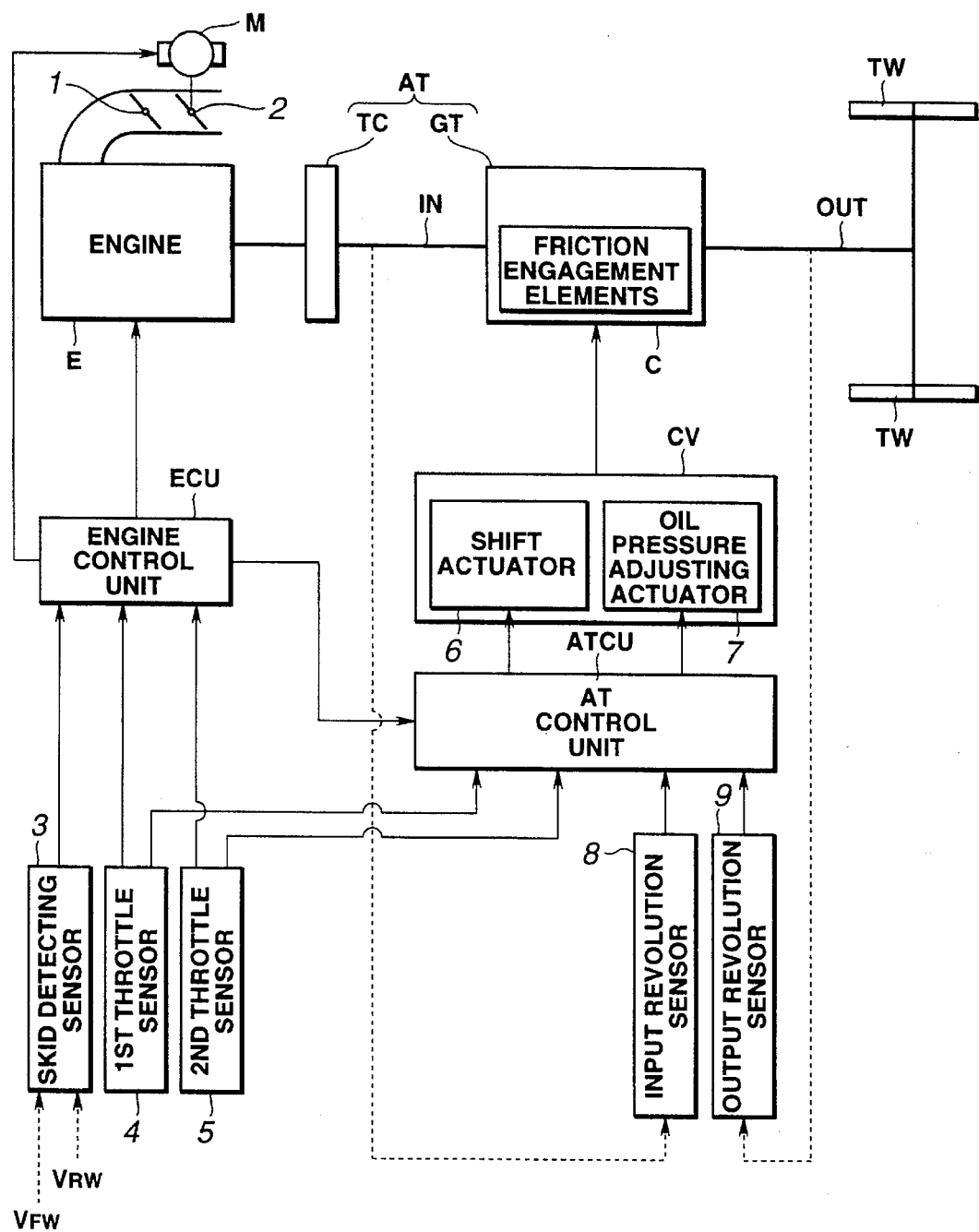
FIG. 1 is a block diagram showing a control system for an automatic transmission according to the present invention.

Referring to the drawings, a control system for an automatic transmission according to the present invention will be described.

Referring first to FIG. 1, a motor vehicle comprises an engine E, an automatic transmission AT, and driving wheels or rear wheels TW. Output torque of the engine E is transmitted to the driving wheels TW through the automatic transmission AT.

Arranged to the engine E are a first throttle valve 1 operated by an accelerator pedal (not shown) and a second throttle valve 2 operated by a motor M in the same way as the prior art. Output torque of the engine E can be adjusted in accordance with opening and closing of the throttle valves 1, 2. The motor M is controlled by an engine control unit ECU to which a skid detecting sensor 3, a first throttle sensor 4, and a second throttle sensor 5 are connected. The skid detecting sensor 3 compares a revolution $V_{RW}$ of the driving wheels TW with a revolution $V_{TW}$ of non-driving wheels (not shown), and determines detection of a skid of the driving wheels TW when the revolution $V_{RW}$ of the driving wheels TW is greater than the revolution $V_{FW}$ of the non-driving wheels over a predetermined value. The first throttle sensor 4 detects an opening degree of the first throttle valve 1, whereas the second throttle sensor 5 detects an opening degree of the second throttle valve 2. When the skid detecting sensor 3 detects a skid of the driving wheels TW, skid reduction control is carried out to drive the motor M in such a direction as to close the second throttle valve 2 until the above skid is not detected.

The automatic transmission AT comprises a torque converter TC and a gear train GT which includes a friction engagement elements C having a multiplate clutch, a band brake, a multiplate brake, etc. With a three-forward-speed automatic transmission disclosed, for example, in JP-A 60-1444, the friction engagement elements C comprises two multiplate clutches, one band brake, and one multiplate brake. It is noted that the number of speed ratios of the automatic transmission is optionally selected, and that in case of four-forward speed or five-forward speed, the number of the friction engagement elements is changed and selected optionally.

The friction engagement elements C can selectively receive a hydraulic pressure out of a control valve CV. That is, the control valve CV receiving a discharge pressure of an oil pump (not shown) as a source pressure selects supply of a hydraulic pressure by a shift actuator 6, and controls a hydraulic pressure value by a hydraulic pressure adjusting actuator 7. The shift actuator 6 includes a plurality of solenoids and shift valves (not shown), and selects supply of a hydraulic pressure by turn-on and turn-off of the solenoids. On the other hand, the hydraulic pressure adjusting actuator 7 includes a solenoid with a duty ratio controlled and regulator valve (not shown), and adjusts a pilot pressure by controlling a rate of opening and closing of an orifice by the solenoid, which is operated to the regulator valve to obtain a desired hydraulic pressure value.

Operation of the shift actuator 6 and the hydraulic pressure adjusting actuator 7 is controlled by a signal out of an automatic transmission control unit ATCU. The automatic transmission control unit ATCU comprises a microcomputer, and fulfills control of a flowchart as shown in FIG. 2 based on signals out of the first and second throttle sensors 4, 5, an input revolution sensor 8 for detecting a revolution of an input shaft IN of the automatic transmission AT, and an output revolution sensor 9 for detecting a revolution of an output shaft OUT thereof, the latter revolution corresponding to a vehicle speed.

Figure 2:
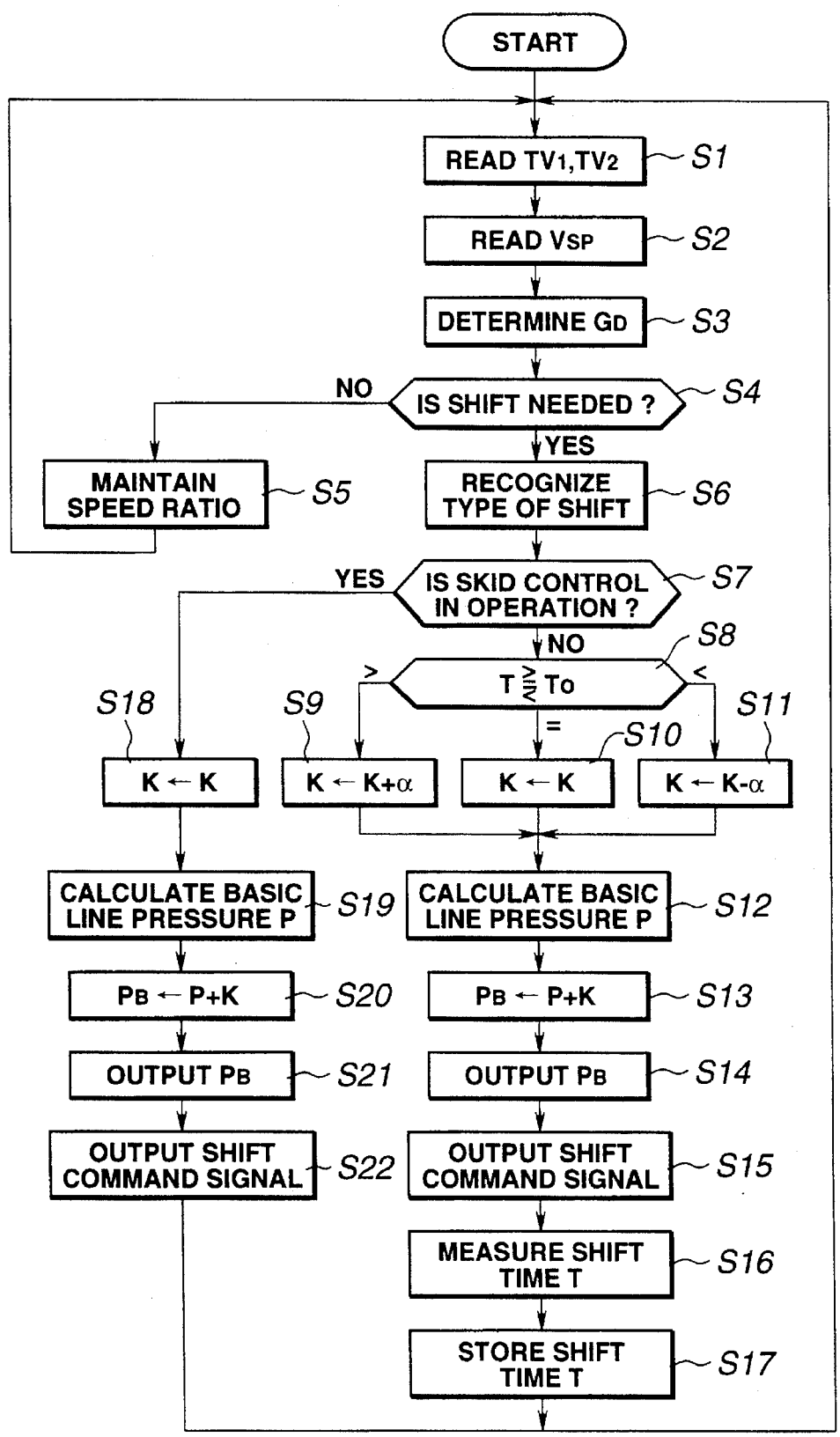
FIG. 2 flowchart showing control of an embodiment of the present invention.

Referring to FIG. 2, the above control will be described.

At a step S1, throttle opening degrees $TV_1$, $TV_2$ are read out of the first and second throttle sensors 4, 5. At a step S2, a vehicle speed $V_{SP}$ is read out of the output revolution sensor 9.

At a step S3, the throttle opening degrees $TV_1$ of the first throttle valve 1 and the vehicle speed $V_{SP}$ are compared with corresponding values in a shift pattern as previously established to determines an optimum speed ratio $G_D$ in the current cruising state.

At a step S4, it is determined whether or not shift is needed, i.e. the speed ratio $G_D$ as determined fails to coincide with a current speed ratio $G_{NOW}$. At the step S4, if the answer is YES, control proceeds to a step S6, whereas if the answer is No, control proceeds to a step S5.

At the step S5, the current speed ratio $G_{NOW}$ is maintained, then control returns to the step S1. At the step S6, the type of shift such as 1–2 shift and 2–3 shift is recognized.

At a step S7, it is determined whether or not skid control is in operation based on output of the engine control unit ECU. At the step S7, if the answer is YES, control proceeds to a step S18, whereas if the answer is NO, control proceeds to a step S8. In such a way, determination that skid control is in operation is carried out at the step S7, so that a part of the automatic transmission control unit ATCU for carrying out this determination and the engine control unit ECU constitute means for detecting an operation of a skid control device.

At the step S8, in connection with previous shift, a shift time T of the type of shift reconized at the step S6 is compared with a reference shift time $T_O$. At the step S8, if the two is the same, strictly, the shift time T is between upper and lower limits of the reference shift time $T_O$, control proceeds to a step S10 where a correction factor K is kept at a current value without carrying out correction. If the shift time T is greater than the reference shift time $T_O$, control proceeds to a step S9 where correction is carried out to set the correction factor K to a new one obtained by adding a constant to the previous correction factor K. And if the shift time T is smaller than the reference shift time $T_0$, control proceeds to a step S11 where correction is carried out to set the correction factor K to a new one obtained by subtracting the constant $\alpha$ from the previous correction factor K. It is noted that the correction factor K and the constant $\alpha$ are hydraulic pressure values (Kgf/cm$^2$), respectively.

At a step S12, a basic line pressure or basic hydraulic pressure value P upon shift is calculated. At a step S13, an optimum hydraulic pressure $P_B$ is obtained by adding the basic line pressure P to the correction factor K. At a step S14, a hydraulic pressure command signal for producing the optimum hydraulic pressure $P_B$ is output to the hydraulic pressure adjusting actuator 7. At a subsequent step S15, a shift command signal is output to the shift actuator 6.

At a step S16, the shift time T required for current shift is measured, then at a step S17, the shift time T as measured is stored. It is noted that measurement of the shift time T is started when the shift command signal is output to the shift actuator 26, and finished when shift completion is determined based on the fact that a gear ratio obtained by a revolution ratio of the input and output revolution sensors 8, 9 is a value corresponding to a speed ratio after shift.

On the other hand, at the step S7, if it is determined that skid control is in operation, control proceeds to a step S18 where correction is carried out to set the correction factor K to that one obtained at the steps S9, S10, S11.

At a step S19, the basic line pressure P is calculated in the same way as the step S12, and at a step S20, the optimum hydraulic pressure $P_B$ is obtained in the same way as the step S13. At a subsequent step S21, the hydraulic pressure command signal for producing the optimum hydraulic pressure $P_B$ is output to the hydraulic pressure adjusting actuator 7 in the same way as the step S14, and at a step S22, the shift command signal is output to the shift actuator 6 in the same way as the step S15.

As described above, at the steps S8–S11 and S18, the new correction factor or correction value K is determined by increasing or decreasing the correction factor K adopted upon previous shift, so that a part of the automatic transmission control unit ATCU for carrying out this determination constitutes means for determining a correction value. Further, a part of the automatic transmission control unit ATCU for calculating the basic line pressure or basic hydraulic pressure value P at the steps S12, S19, a part thereof for computing the optimum hydraulic pressure PB at the steps S13, S20, and a part thereof for outputting a signal thereof constitute means for determining a hydraulic pressure. Furthermore, a part of the automatic transmission control unit ATCU for determining the optimum speed ratio $G_D$ at the step S3, and a part thereof for carrying out shift determination at the steps S4–S6 and outputting a command thereof at the steps S15, S22 constitute means for carrying out shift command.

Next, a description will be made with regard to operation of self-learning of the control system upon shift.

In case that when it is determined that shift is 0 needed based on a result of comparison of the throttle opening degree $TV_1$ and the vehicle speed $V_{SP}$ with the corresponding values in the shift pattern, the engine control unit ECU does not output to the motor M a control signal for decreasing a skid of the driving wheels TW, the previous shift time T is compared with the reference shift time $T_O$ every type of shift in the same way as the prior art, determining the correction factor K in accordance with a result of comparison thereof (steps S6–S11). And the optimum hydraulic pressure $P_B$ is obtained by the basic line pressure P and the correction factor K determined based on a smaller one of the throttle opening degrees $TV_1$, $TV_2$ of the throttle valves 1, 2, and a hydraulic command signal for producing the optimum hydraulic pressure $P_B$ and a shift command signal are output to the actuators.

On the other hand, in case that when it is determined that shift is needed, the engine control unit ECU outputs to the motor M a control signal for decreasing a skid of the driving wheels TW, the automatic transmission control unit ATCU prohibits control of comparing the shift time T with the reference shift time $T_O$ to increase or decrease the correction factor K (steps S8–S11). And when determining the optimum hydraulic pressure $P_B$ the correction factor K used upon previous shift is adopted for the second time.

In such a way, when output torque of the engine E differs from a value during normal operation due to an opening degree of the second throttle valve 2 controlled by operation of skid reduction control, self-learning for determining the correction factor K based on the shift time T is not carried out, obtaining an effect that erroneous self-learning due to skid reduction control can be prevented. Moreover, in this embodiment, self-learning for determining the correction factor K based on the shift time T is prohibited as described above, while the current correction factor K is determined out of the previous one, obtaining an effect that not only erroneous self-learning can be prevented as described above, but a result of self-learning up to the present can be reflected in control.

Having described the present invention in connection with the preferred embodiment, it is noted that the present invention is not limited thereto, and various changes and modifications can be made without departing from the spirit of the present invention.

By way of example, in this embodiment, the skid control device comprises the second throttle valve 2 operated by the motor M and for controlling output torque of the engine E in accordance with opening and closing of thereof. However, in view of the fact that the skid control device needs only to enable a decrease in drive torque of the driving wheels, it may be means for modifying engine output torque such as engine ignition delayed angle control, fuel cut, etc., and means for braking the driving wheels.

Figure 3:
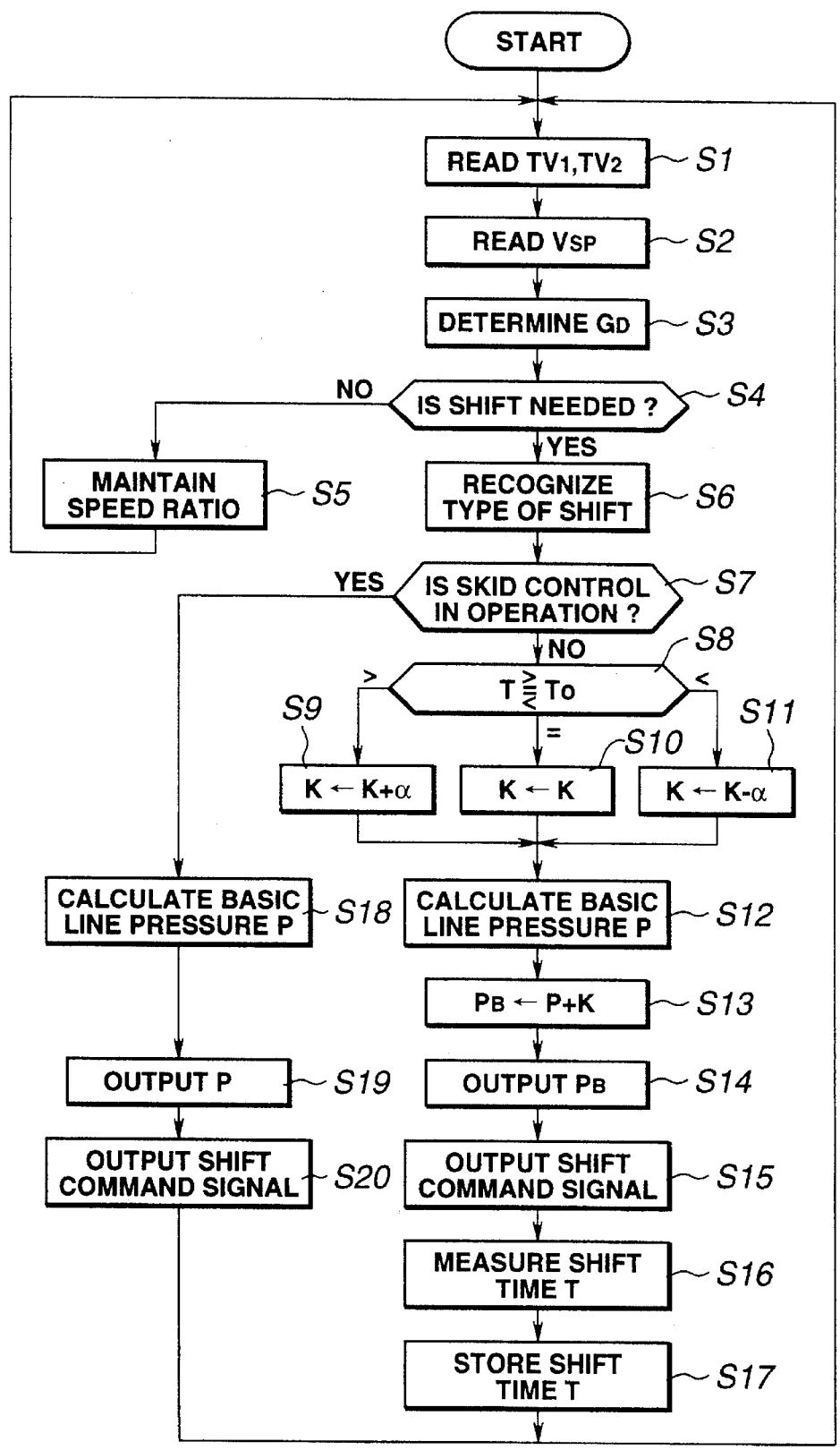
FIG. 3 is a view similar to FIG. 2, showing control of another embodiment of the present invention.

Moreover, in this embodiment, when determining that skid control is in operation (step S7), and prohibiting an increase or decrease in the correction factor K (step S18 and the subsequent), the previous correction factor K is adopted. Alternatively, referring to a flowchart in FIG. 3, the modification may be made such that at a step S18, the basic line pressure P is calculated simply based on a smaller one of the throttle opening degrees $TV_1$, $TV_2$ and the vehicle speed $V_{SP}$, and at a step S19, a signal for producing the basic line pressure P is output to the hydraulic pressure adjusting actuator 6. It is noted that in this embodiment, control at steps S1–S17 is the same as that one in the embodiment as shown in FIG. 2.

What is claimed is:

1. A system for controlling an automatic transmission of a motor vehicle provided with an engine and driving wheels, the automatic transmission having friction engagement elements, a first actuator for switching a state of supplying hydraulic pressure to the friction engagement elements, and a second actuator for adjusting hydraulic pressure, the system comprising:

means for detecting a cruising state of the motor vehicle, said detecting means including mean for detecting an operation of skid reduction control for decreasing torque of the driving wheels when detecting skid thereof;

means for determining an optimum speed ratio in accordance with said cruising state detected, and providing to the first actuator a signal indicative of said optimum speed ratio determined;

means for determining an optimum value of hydraulic pressure upon shift based on a basic value of hydraulic pressure determined by at least an information on a load of the engine of said cruising state detected and a correction value thereof, and providing to the second actuator a signal indicative of said optimum value determined; and means for determining said correction value upon current shift by carrying out a comparison of a shift time upon previous shift with a reference shift time previously established, and modifying in accordance with a result of said comparison said correction value upon previous shift so that said shift time upon current shift approaches said reference shift time, said correction value determining means being prohibited from at least modifying said correction value when said operation detecting means detects said operation of skid reduction control.

2. A system as claimed in claim 1, wherein said correction value determining means adopts said correction value upon previous shift when said operation detecting means detects said operation of skid reduction control.

3. A method of controlling an automatic transmission of a motor vehicle provided with an engine and driving wheels, the automatic transmission having friction engagement elements, a first actuator for switching a state of supplying hydraulic pressure to the friction engagement elements, and a second actuator for adjusting hydraulic pressure, the method comprising the steps of:

detecting a cruising state of the motor vehicle, said detecting step including a step of detecting an operation of skid reduction control for decreasing torque of the driving wheels when detecting skid thereof;

determining an optimum speed ratio in accordance with said cruising state detected, and providing to the first actuator a signal indicative of said optimum speed ratio determined;

determining an optimum value of hydraulic pressure upon shift based on a basic value of hydraulic pressure determined by at least an information on a load of the engine of said cruising state detected and a correction value thereof, and providing to the second actuator a signal indicative of said optimum value determined; and determining said correction value upon current shift by carrying out a comparison of a shift time upon previous shift with a reference shift time previously established, and modifying in accordance with a result of said comparison said correction value upon previous shift so that said shift time upon current shift approaches said reference shift time, said correction value determining step being prohibited from at least modifying said correction value when said operation detecting step reveals detection of said operation of skid reduction control.

4. A method as claimed in claim 3, wherein said correction value determining step adopts said correction value upon previous shift when said operation detecting step reveals detection of said operation of skid reduction control.

5. In a motor vehicle provided with an engine, driving wheels, and an automatic transmission having friction engagement elements, a first actuator for switching a state of supplying hydraulic pressure to the friction engagement elements, and a second actuator for adjusting hydraulic pressure:

means for detecting a cruising state of the motor vehicle, said detecting means including means for detecting an operation of skid reduction control for decreasing torque of the driving wheels when detecting skid thereof;

means for determining an optimum speed ratio in accordance with said cruising state detected, and providing to the first actuator a signal indicative of said optimum speed ratio determined;

means for determining an optimum value of hydraulic pressure upon shift based on a basic value of hydraulic pressure determined by at least an information on a load of the engine of said cruising state detected and a correction value thereof, and providing to the second actuator a signal indicative of said optimum value determined; and means for determining said correction value upon current shift by carrying out a comparison of a shift time upon previous shift with a reference shift time previously established, and modifying in accordance with a result of said comparison said correction value upon previous shift so that said shift time upon current shift approaches said reference shift time, said correction value determining means being prohibited from at least modifying said correction value when said operation detecting means detects said operation of skid reduction control.

6. A motor vehicle as claimed in claim 5, wherein said correction value determining means adopts said correction value upon previous shift when said operation detecting means detects said operation of skid reduction control.

* * * * *